United States Patent [19]

Snow

[11] Patent Number: 5,305,597
[45] Date of Patent: Apr. 26, 1994

[54] GAS TURBINE FUEL CONTROL

[75] Inventor: Barton H. Snow, Cincinnati, Ohio

[73] Assignee: General Electric Company, Cincinnati, Ohio

[21] Appl. No.: 78,708

[22] Filed: Jun. 16, 1993

Related U.S. Application Data

[62] Division of Ser. No. 666,315, Mar. 8, 1991, Pat. No. 5,259,186.

[51] Int. Cl.[5] ............................................. F02C 9/28
[52] U.S. Cl. .................................................. 60/39.281
[58] Field of Search ...................... 60/39.281, 243, 734

[56] References Cited

U.S. PATENT DOCUMENTS 4,078,378  3/1978  Gold .................................. 60/39.281
4,508,127  4/1985  Thurston ........................... 60/39.281
4,809,499  3/1989  Dyer .................................. 60/39.281

*Primary Examiner*—Louis J. Casaregola
*Attorney, Agent, or Firm*—Jerome C. Squillaro; Bernard E. Shay

[57] ABSTRACT

An electronic fuel control for a gas turbine engine monitors the mass density of the fuel. As the mass density of the fuel varies when the fuel temperature changes or when the fuel type changes, the electronic fuel control adjusts an initial mass density to a corrected value based on the most recent measurement of mass fuel flow that was taken when the mass fuel flow measurement was known to be accurate. Accurately controlling mass fuel flow permits gas turbine engine designers to reduce tolerances in moving parts which improves the efficiency of the gas turbine engine.

2 Claims, 3 Drawing Sheets

GAS TURBINE FUEL CONTROL

This application is a division of application Ser. No. 07/666,315, filed Mar. 8, 1991, now U.S. Pat. No. 5,259,186.

FIELD OF THE INVENTION

This invention relates, in general, to fuel controls for gas turbine engines and, more particularly, to a method and apparatus which automatically corrects fuel flow for variations in the mass density of the fuel.

BACKGROUND OF INVENTION

Control of a jet engine is accomplished by providing a known mass flow of fuel based on a demand which may be established by an electronic control. The electronic control may be digital microprocessor based or may be analog and constructed of discrete electronic components. Accurate and continuous control of mass fuel flow is required over a broad range of engine operating conditions in order to provide reliable, fuel efficient operation. Some mass flow meters may not provide an accurate indication of mass flow while engine conditions are changing or fuel flow is low.

Several seconds of constant fuel flow at a flow rate above 20% of the maximum rated fuel flow is normally required for a mass flow meter to generate a mass flow signal accurate enough for engine control use. Therefore, a volumetric fuel flow methodology is generally used instead. For example, a volumetric fuel flow methodology may be implemented by controlling the flow area of a metering valve while maintaining a known differential pressure across the metering valve. The flow area is the size of the metering valve aperture which can be measured and controlled by external means.

The volumetric flow method in general use assumes that the mass density of the fuel remains constant during operation. A preselected value of mass density is stored in the electronic control circuitry. The electronic control circuitry determines the desired volumetric flow by dividing the desired mass flow by the preselected mass density. However, discrepancies may occur between the actual mass density and the preselected mass density when fuel type changes or when the fuel temperature varies. Engine designers may compensate for these discrepancies by designing in increased tolerances in the rotating parts of the gas turbine engine, or by attempting to make corrections that simulate changes in the mass density, both of these techniques tend to increase fuel consumption or prolong engine transients.

SUMMARY OF THE INVENTION

According to one embodiment of the present invention, a gas turbine fuel control is provided. The gas turbine fuel control includes a pressurized fuel source, a pressure regulator, a variable position metering valve, a resolver, a mass flow meter and electronic control circuitry. The metering valve, the resolver, and the mass flow meter work together with the electronic control circuitry to generate a feedback signal that is an accurate measure of the mass fuel flow. The pressurized fuel source and pressure regulator hold the differential pressure across the metering valve at a known selectable value, usually constant, thereby accurately relating the area signal to the volumetric flow of fuel to the gas turbine engine. The signal generated by the metering valve and the resolver is electronically processed to represent a dynamic value of either a mass fuel flow, a volumetric fuel flow, or a flow area of the metering valve.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

DESCRIPTION OF THE PREFERRED EMBODIMENTS

Figure 1:
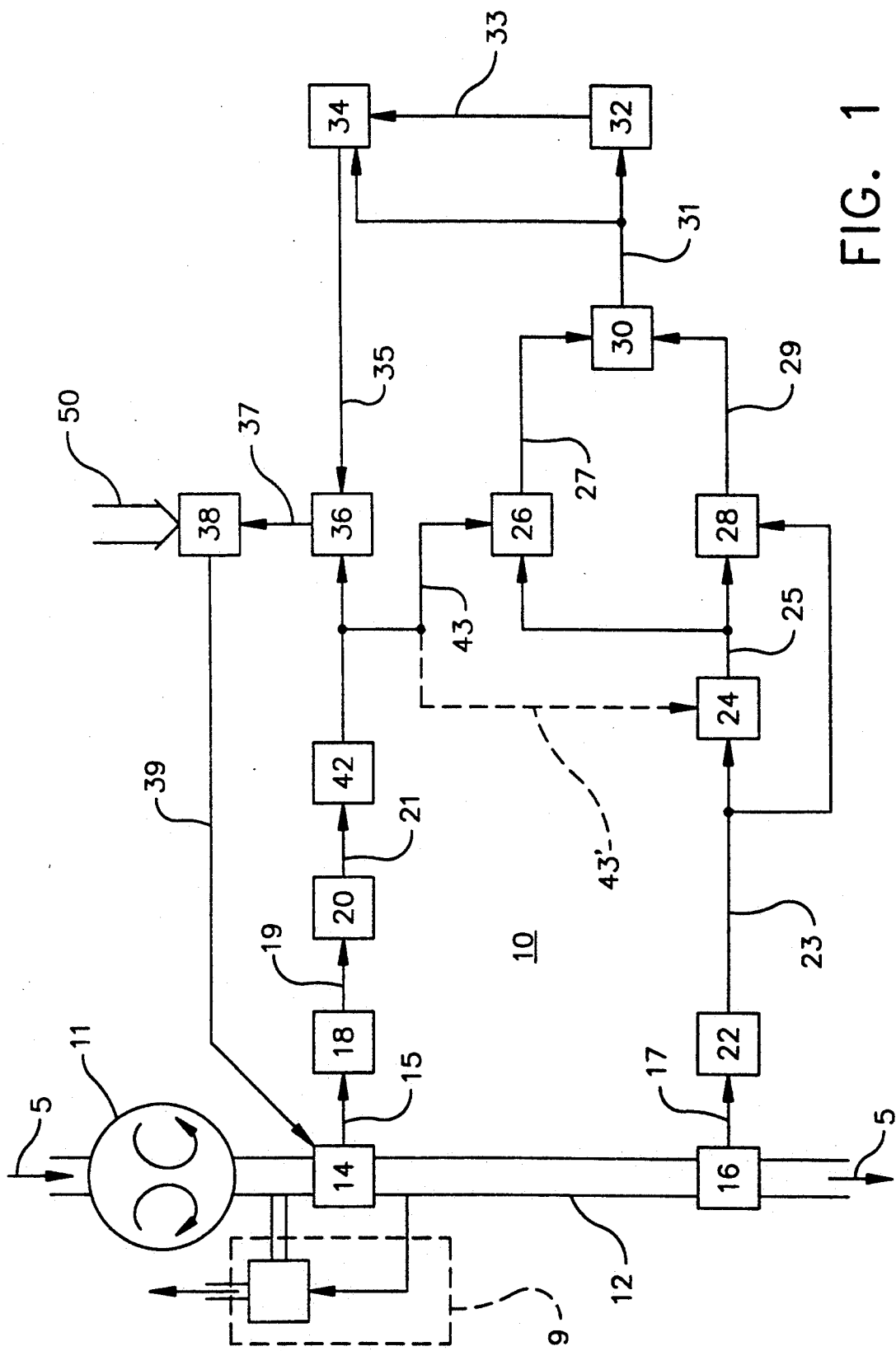
FIG. 1 is a schematic and block diagram illustrating a fuel metering system according to one embodiment of the present invention.

Referring now to the figures, wherein like reference numerals have been used throughout to designate like parts or like features. FIG. 1 illustrates a schematic diagram of a fuel control system 10 for a gas turbine engine (not shown). Fuel control system 10 includes a pressurized fuel source 11 and a pressure regulator 9 which are designed to maintain a constant differential pressure across a metering valve 14. A mass flow meter 16 is located in series with metering valve 14. It is preferred that mass flow meter 16 be located physically close to metering valve 14 to ensure that they are flowing fuel at or near the same temperature. Metering valve 14 has a variable flow area that controls the volumetric flow of fuel 5 in fuel line 12. A resolver 18 dynamically measures the position of metering valve 14 and generates a corresponding area signal 19 that is directly proportional to the flow area. A volume signal circuit 20 converts area signal 19 to a volume signal 21 by solving the standard volumetric flow equation, $$Q = CA(\Delta P)^{\frac{1}{2}},$$

where

Q is the volume flow in fuel line 12,
C is a calibration constant,
A is the flow area of metering valve 14 and
$\Delta P$ is the differential pressure across the metering valve 14 (normally a constant).

Transfer circuit 42 converts volume signal 21 to a standard mass flow signal 43 according to a predetermined transfer function. Standard mass flow signal 43 represents the product of volume signal 21 and predetermined value of mass density of fuel at a constant standard temperature, $T_O$, and has units of, for example, lbs/sec. Transfer circuit 42 may be, for example, a look up table.

Mass flow meter 16 generates a flow meter signal 17 that may be used when the mass fuel flow measurement is accurate. For example, when the fuel flow measured by mass flow meter 16 varies less than 1% for 10 seconds and is higher than 20% of its maximum rated value, meter signal 17 would be considered accurate. A signal conditioning circuit 22 acts as a buffer-driver for flow meter signal 17 and generates a mass flow signal 23 which has the same units, for example, lbs/sec., as standard mass flow signal 43 and represents the true mass flow of fuel when mass flow signal 23 is accurate. Signal conditioning circuit 22 may be, for example an amplifier with a predetermined gain. It will be recognized that, in some embodiments of the presentation, signal conditioning circuit 22 may be included as part of mass flow meter 16. Alternatively, for some mass flow meters, it may not be necessary to use a signal conditioning circuit. An accuracy criteria circuit 24 determines when fuel flow is accurate by continuously comparing mass flow signal 23 to a predetermined accuracy criteria that is established for mass flow meter 16. Accuracy criteria circuit 24 may be, for example, a signal selection criteria circuit or a lookup table. Alternatively, the accuracy of mass flow signal 23 may be determined by using accuracy criteria circuit 24 to monitor the stability of standard mass flow signal 43, as illustrated by dotted line 43'. The stability of mass flow signal 43' may be a more accurate indicator of any real time fluctuations in the mass flow of fuel than fluctuations in the mass flow signal 23. Thus, using the stability of standard mass flow signal 43' as an input to accuracy criteria circuit 24 may improve the accuracy of the present invention.

When mass flow signal 23 is determined to be accurate, accuracy criteria circuit 24 generates a latch signal 25 that causes latch and hold circuits 26 and 28 to simultaneously store the value of standard mass flow signal 43 and mass flow signal 23, respectively. For example, the accuracy criteria circuit 24 could generate latch signal 25 when the mass flow signal is constant at a flow rate greater than 20%±1% of the maximum rated fuel flow for a period of 10 seconds. The outputs of latch and hold circuits 26 and 28 are signals 27 and 29, respectively, and are representative of the stored values of standard mass flow signal 43 and mass flow signal 23, respectively.

Division circuit 30 divides stored signals 27 and 29 and produces a unitless calibration signal 31 which is proportional to the instantaneous fuel density. Calibration signal 31 is used to adjust standard mass flow signal 43 in multiplication circuit 36 to reflect any variation in the mass density of the fuel. It will be apparent to those of skill in the art that signal 31 may be updated by activating latch and hold circuits 26 and 28 at a rate sufficient to detect and store changes in the fuel properties. Authority range circuit 32 continuously monitors calibration signal 31 to ensure its value is within a predetermined authority range and generates a latch signal 33 when signal 32 is within the predetermined authority range. Authority range circuit may be, for example, a lookup table Latch signal 33 tells latch and hold circuit 34 to store calibration signal 31. If calibration signal 31 is outside the authority range, the calibration signal is not stored and the last acceptable value is used until it is updated by a new calibration signal that is within the authority range. Thus, latch and hold circuit 34 generates an output 35 that is equivalent to the most recently stored acceptable value of calibration signal 31.

Multiplication circuit 36 multiplies signals 35 and 43. Thus, feedback signal 37 is representative of the product of the values of standard mass flow signal 43 and stored calibration signal 35. An electronic control unit (ECU) 38 monitors feedback signal 37 and uses it to determine what the actual mass flow of fuel is and whether it matches the demand established from internally stored control parameters and other sensory inputs 50. ECU 38 may be, for example, a microprocessor which calculates the control parameters for the gas turbine engine by following instructions stored in software. When the mass flow of fuel demanded is different than the mass flow of fuel indicated by feedback signal 37, ECU 38 generates a fuel control signal 39 which resets the position of metering valve 14 until the measured mass fuel flow matches the demanded fuel flow.

Figure 2:
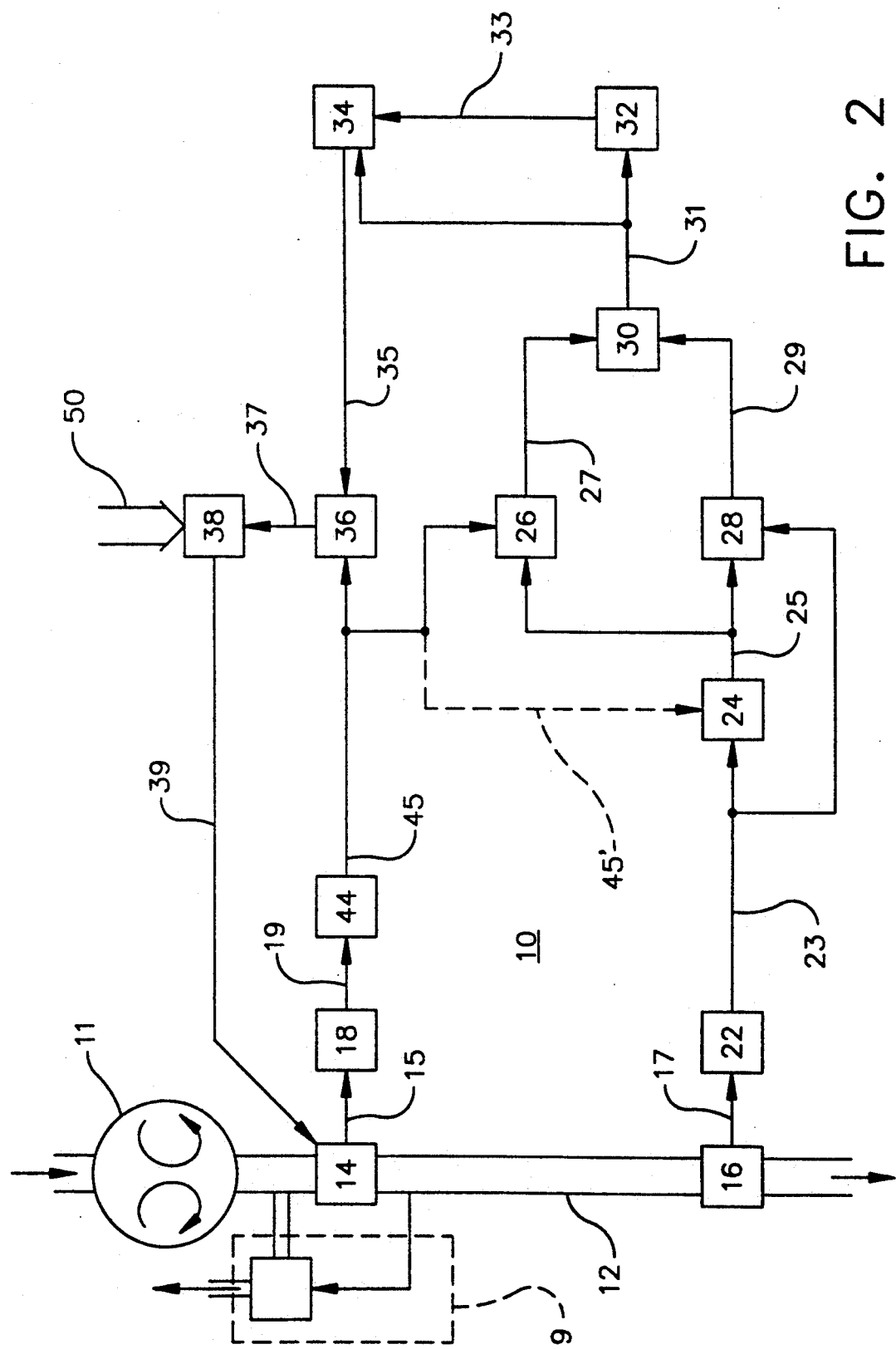
FIG. 2 is a schematic and block diagram illustrating a fuel metering system according to a further embodiment of the present invention.

An alternate embodiment of the present invention is depicted in FIG. 2. In the embodiment illustrated in FIG. 2, area signal circuit 44 replaces volume signal circuit 20 and transfer function circuit 42 from the embodiment illustrated in FIG. 1. Further, area signal 45 replaces standard mass flow signal 43. Area signal circuit 44, as illustrated in FIG. 2, provides a calibrated area signal 45 with the units of, for example, $in^2$, which is simultaneously stored in latch and hold circuit 26 as described with respect to the embodiment illustrated in FIG. 1. The output of circuit 26 is divided by the output of circuit 28 in divider 30. The output of divider 30 is calibration constant signal 31 which is stored in latch and hold circuit 34 as described with respect to the embodiment illustrated in FIG. 1. Signal 31 carries the units of, for example, $(lbs/sec)/in^2$. Signal 31 is stored in latch and hold 34 as described with respect to the embodiment of FIG. 1. Multiplication circuit 36 multiplies stored calibration signal 35 by area signal 45 to produce feedback signal 37. ECU unit 38 functions as described with respect to the embodiment illustrated in FIG. 1. ECU 38 monitors feedback signal 37 and generates metering valve position signal 39 which resets the metering valve to a position that will satisfy the fuel flow demand established from internally stored control parameters and other sensory inputs 50.

Figure 3:
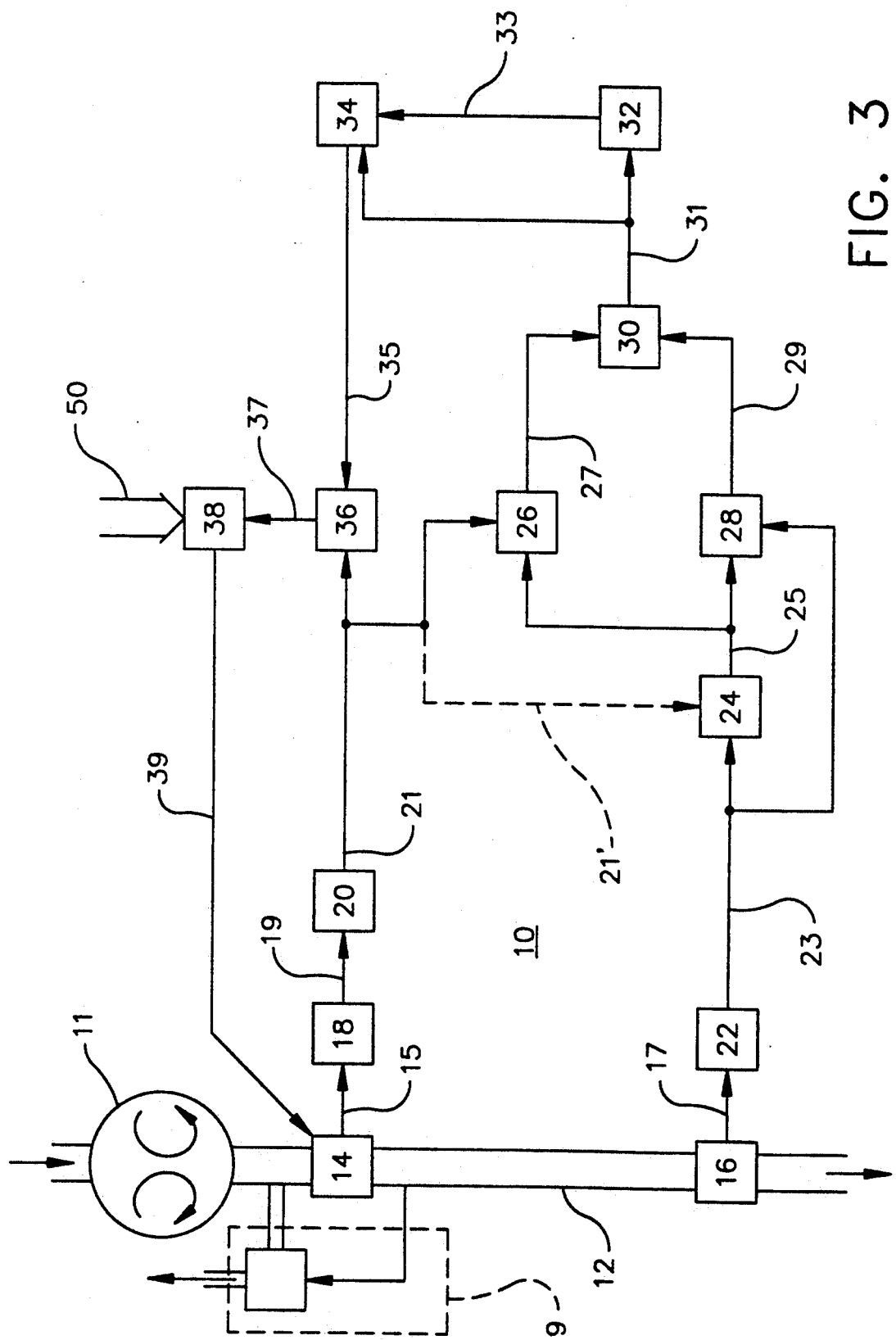
FIG. 3 is a schematic and block diagram illustrating a fuel metering system according to a further embodiment of the present invention.

In a further embodiment of the present invention, illustrated in FIG. 3, the output of resolver circuit 18, signal 19, is an input to volume circuit 20 which may be, for example, a look up table. The output of volume circuit 20 is Volume flow signal 21. Volume flow signal 21 has the units of, for example, $in^3/sec$. Latch and hold circuit 26 stores volume signal 21. Calibration constant signal 31 has the units of $lbs/in^3$. Signal 31 in FIG. 3 is a calibration constant which represents an updated mass density of fuel 5 and is stored in latch and hold circuit 34 as described with respect to the embodiment illustrated in FIG. 1. Calibration constant 31 is checked to verify that its value is within the preselected limits set by authority range circuit 32 (as described with respect to the embodiment illustrated in FIG. 1) and stored in latch and hold circuit 34 if it is within the preselected limits. Multiplication circuit 36 multiplies stored calibration signal 35 by volume flow signal 21 to produce feedback signal 37. ECU 38 monitors feedback signal 37 and generates metering valve position signal 39 that resets the metering valve to a position that will satisfy the fuel flow demand established from internally stored control parameters and other sensory inputs 50.

Therefore, in the embodiment illustrated in FIG. 1, the calibration constant 35 is multiplied by the standard mass flow 43 to generate the feedback signal 37. In the embodiment illustrated in FIG. 2, the calibration constant 35 is multiplied by the area signal 45 to generate the feedback signal 37. In the embodiment illustrated in FIG. 3, calibration constant 35 is multiplied by the volumetric fuel flow signal 21 to generate the feedback signal 37.

Therefore, generally according to the present invention, the Mass flow meter generates a signal which is representative of the mass flow of fuel under predetermined conditions. The mass flow meter signal may be used for control when it is valid. For example, the mass flow meter signal may be considered accurate when it does not change more than 1% for 10 seconds and its value is larger than 30% of its maximum rated value. The electronic control circuitry, according to the present invention, determines when the signal from the mass flow meter is usable and processes it, along with the signal generated by the metering valve and resolver to form a calibration constant signal. The circuitry according to the present invention continuously monitors the validity of the mass flow signal and updates the calibration constant when the mass flow signal is valid. It will be recognized that the value of the calibration constant will change when the density of the fuel varies. For example, expansion and contraction of the fuel due to temperature variations causes the mass density of the fuel to change. Therefore, data from the metering valve, resolver and calibration constant are used to generate feedback signal, which accurately represents the mass flow of fuel to the gas turbine engine. The ECU, internally stored engine parameters, and other sensory inputs determine a mass fuel flow demand. Once the mass fuel flow demand has been calculated, the calculated value may be compared with the feedback signal, which is representative of the actual mass fuel flow. If the demanded fuel flow differs from the actual fuel flow, the ECU may generate signal which adjusts the metering valve until the demanded mass fuel flow corresponds to the actual mass fuel flow.

It will be recognized that accuracy requirements may vary for different mass flow meters and for each engine application. When the accuracy criteria is met, the electronic control circuitry simultaneously stores the value for mass flow and for either the flow area of the metering valve, the valumetric flow or the standard mass flow. Acceptable values of the calibration constant are determined by the engine application. An authority range is established within the electronic control circuitry to ensure that the calibration constant is within the range of acceptable values. Since it may not be desirable to have the calibration constant change too quickly, the authority range may be a function of successive values of the calibration constant, limiting the rate of change of the calibration constant. Alternatively, a calibration constant that is within the authority range, may be stored by latch and hold circuit until it is updated by a more current value within the authority range.

The stored engine parameters vary for different engines. The ECU contains control laws established for each engine type. The control laws are designed to ensure that the engine operates the engine within its limits (i.e., to prevent the engine from exceeding its operating limits). For example, the ECU may be programmed with the maximum RPM, the maximum temperature and the maximum acceleration rate for the engine. The ECU will not allow the fuel flow to exceed the stored maximum. The ECU also uses other sensory inputs such as throttle position, fan speed, core speed, burner pressure, inlet temperature, burner temperature and exhaust temperature to establish the mass fuel flow demand.

While the present invention is described in the previous embodiments, it will be appreciated by those skilled in the art, that various modifications to this invention may be made without departing from the true spirit and scope of the present invention. Specifically, the control functions have been described in the terms of electronic circuitry. However, the functional aspects of the control circuitry could easily be performed by software stored in the Electronic Control Unit. It is intended that all such variations be covered by the claims following herein and all such equivalents thereof that fall within the true spirit and scope of the invention.

I claim:
1. A fuel control for a gas turbine engine comprising:
   a) a metering valve having a variable flow area;
   b) means for measuring said flow area of said metering valve which is adapted to produce a first signal directly related to said flow area;
   c) means for measuring a mass flow of fuel through said metering valve which is adapted to produce a second signal directly related to said mass flow;
   d) means for determining that said second signal conforms to a specified accuracy criteria which is adapted to produce a third signal that indicates that said second signal conforms to said accuracy criteria;
   e) means for simultaneously storing said first and said second signals when said third signal indicates that said second signal conforms to said accuracy criteria;
   f) means for producing a fourth signal that relates the quotient of said stored first signal and said stored second signal;
   g) means for storing said fourth signal when said fourth signal is within a predetermined authority range;
   h) means for producing a fifth signal that is equivalent to the product of said first signal and said stored fourth signal;
   i) an electronic control that positions said metering valve as a function of said fifth signal.

2. A fuel control as described in claim 1 wherein said quotient is said stored second signal divided by said stored first signal.

* * * * *